United States Patent Office 3,060,332
Patented Oct. 23, 1962

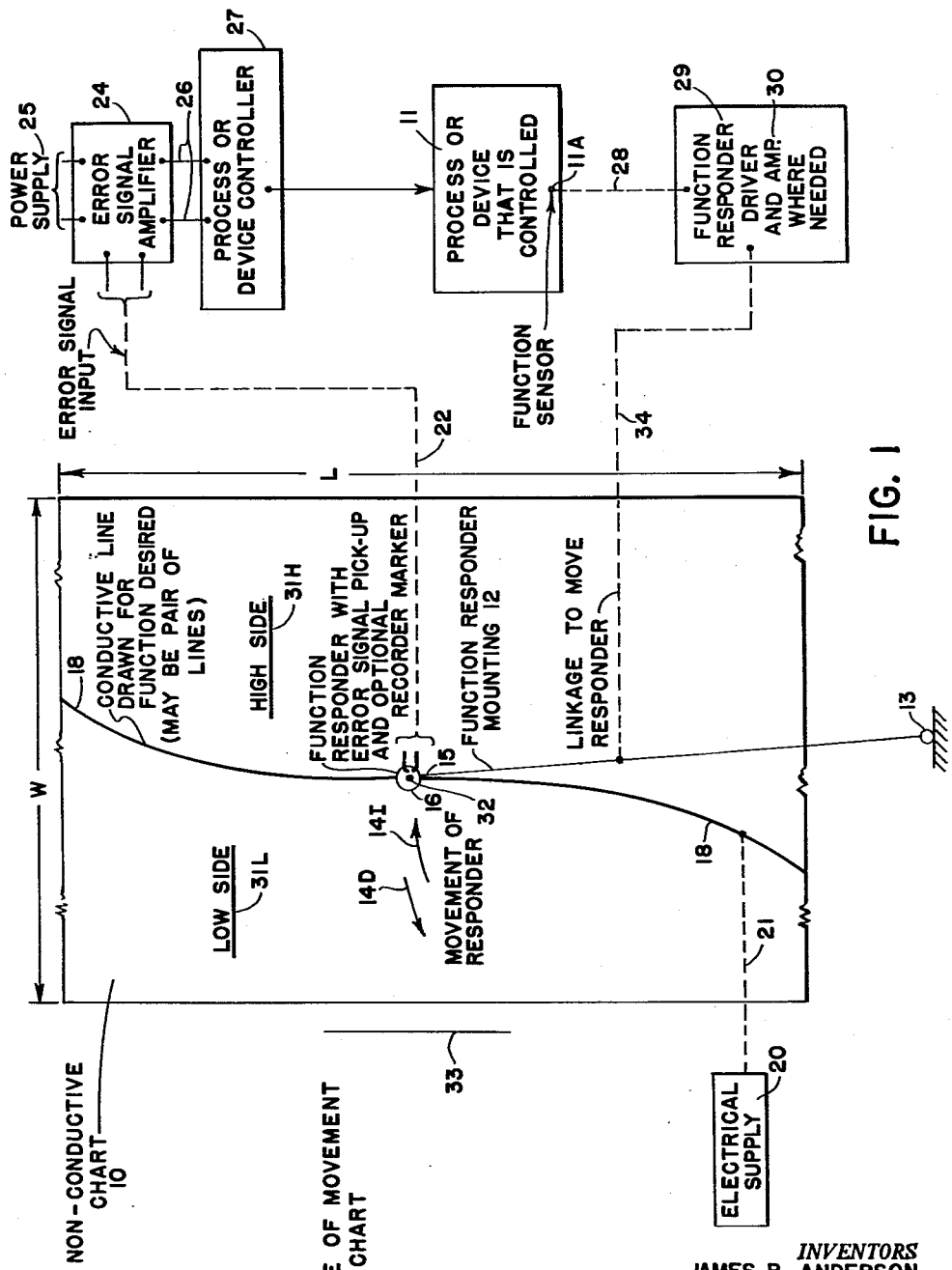

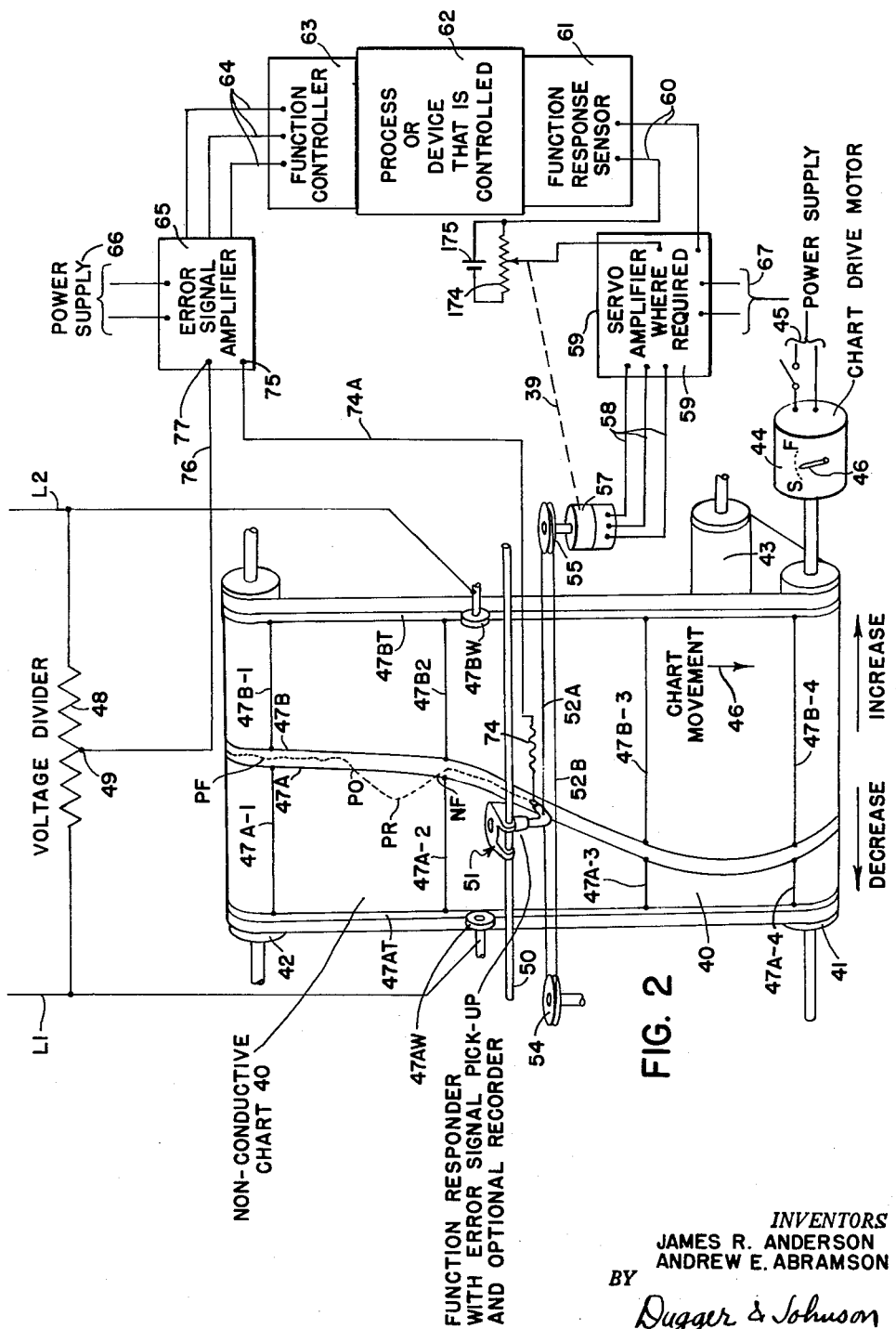

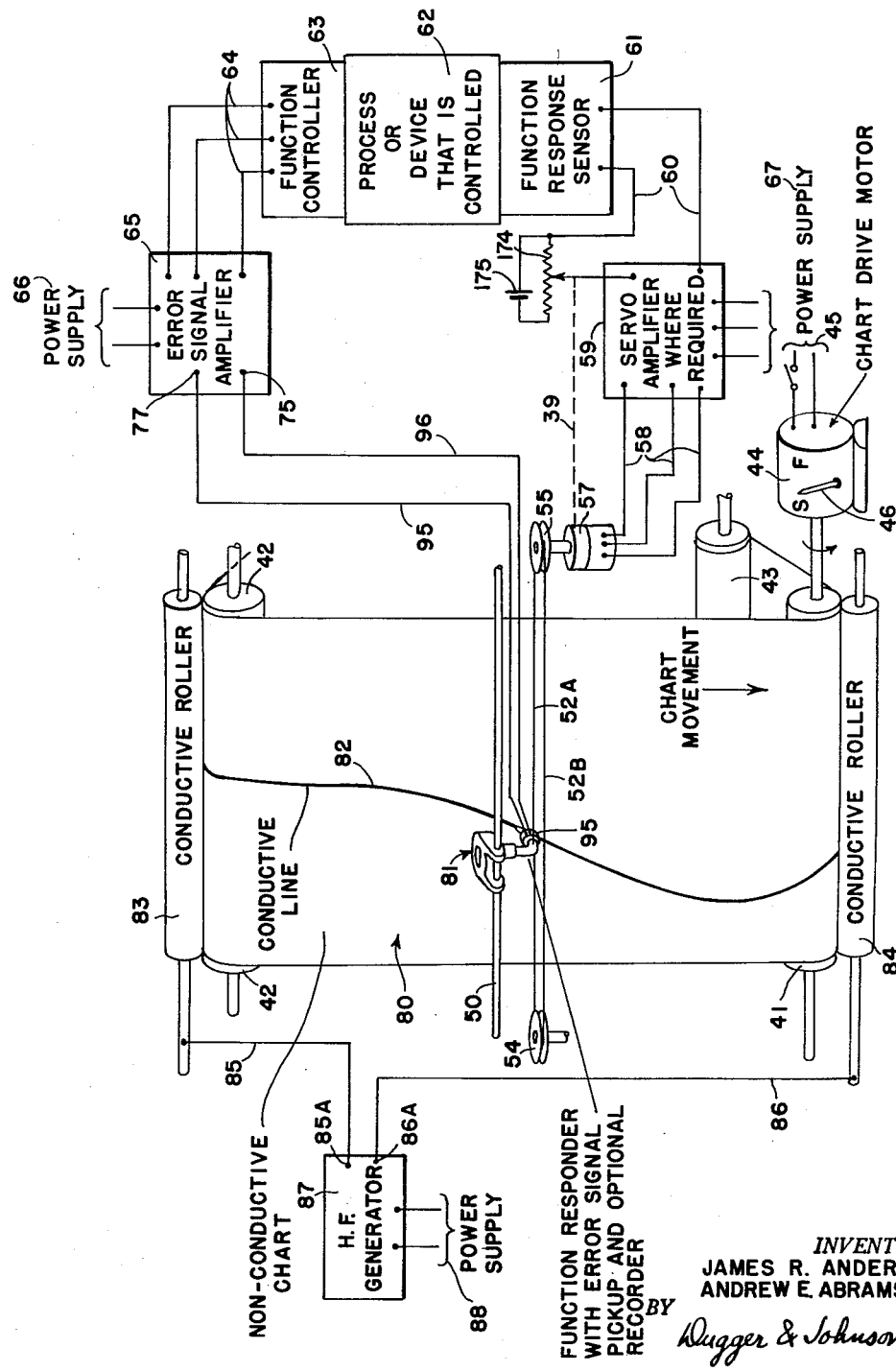

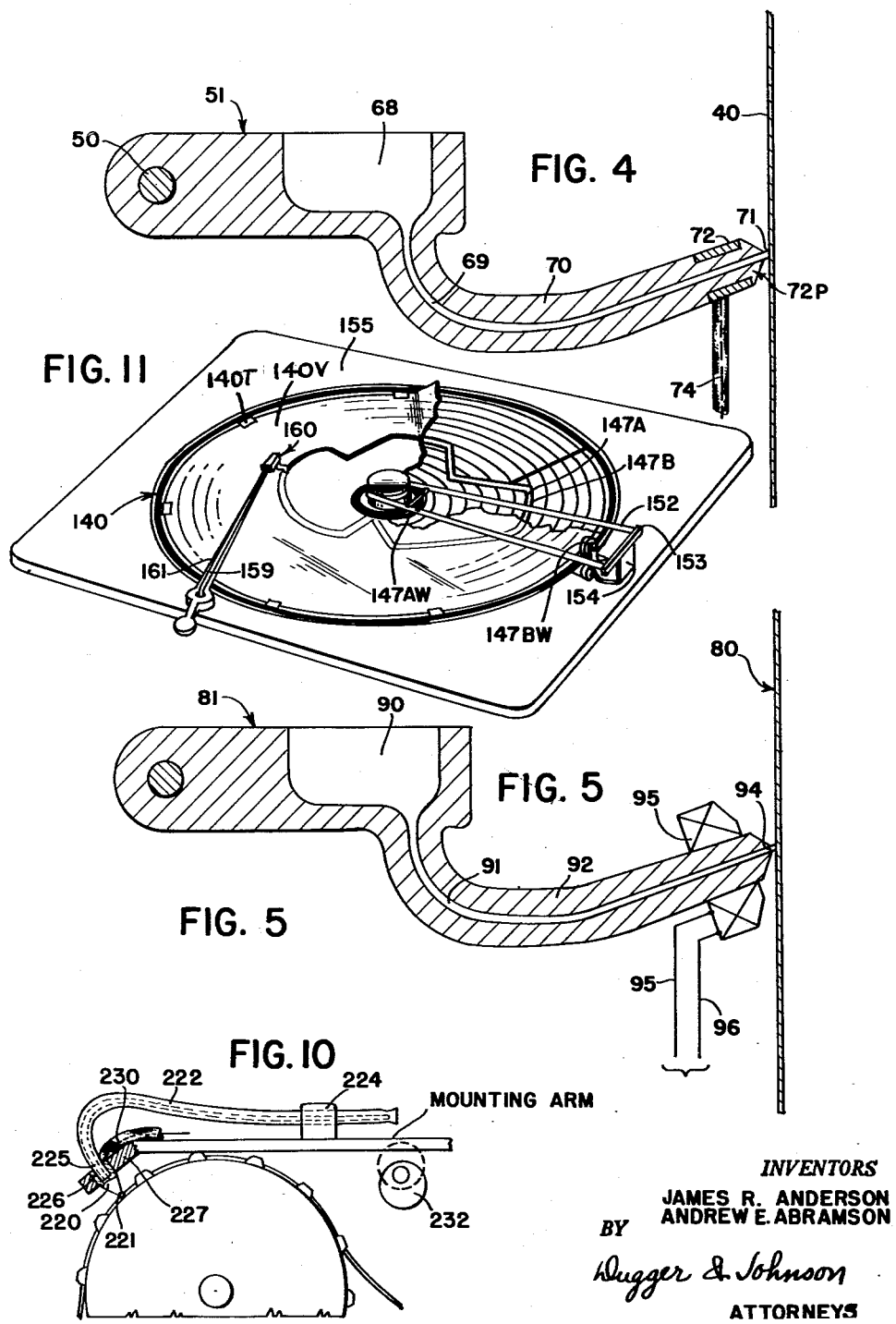

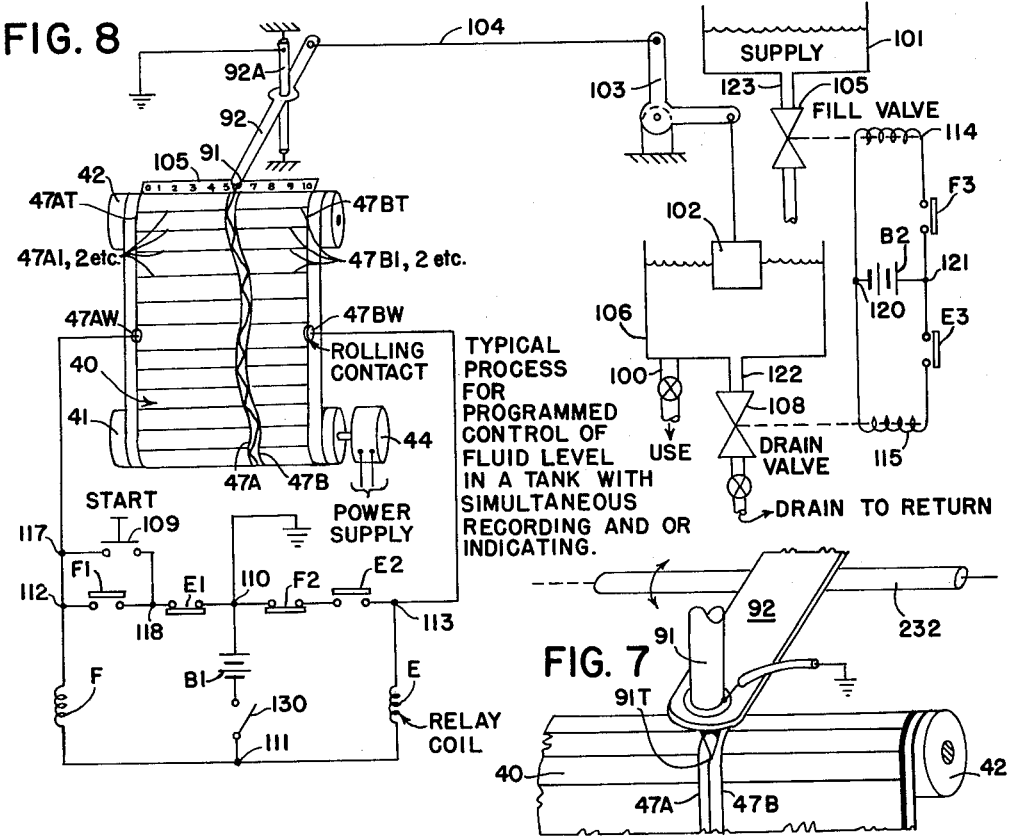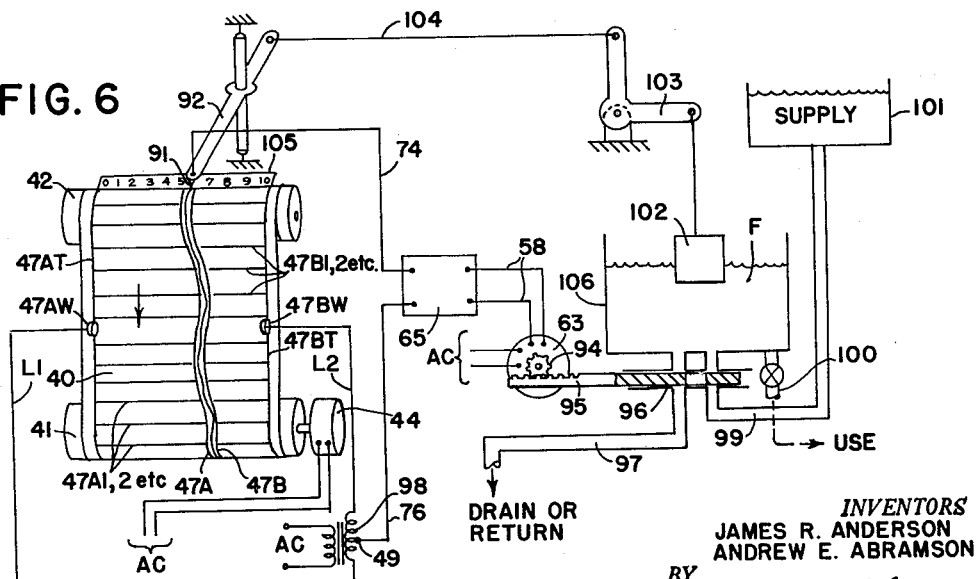

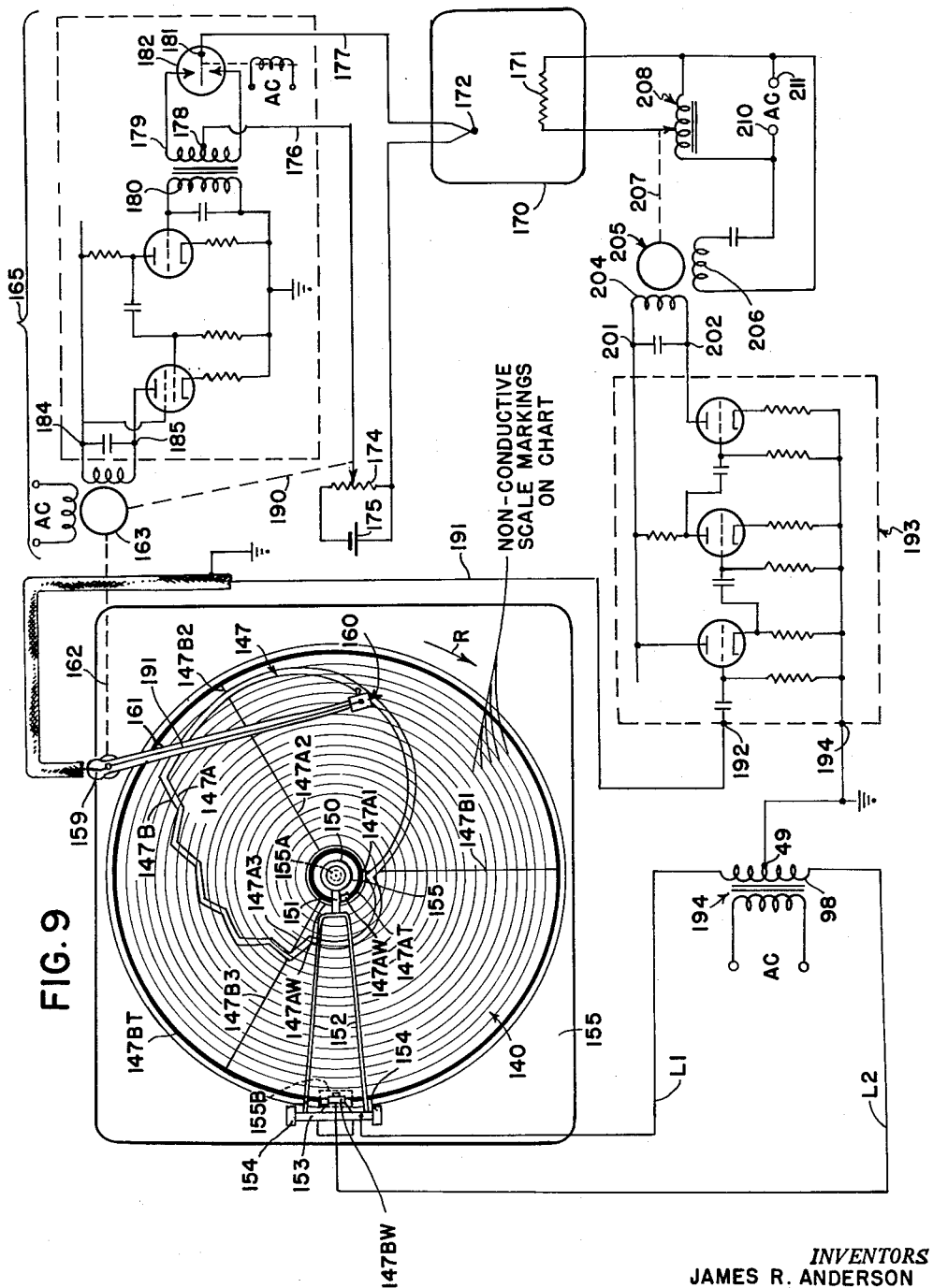

3,060,332
METHOD AND APPARATUS FOR SIMULTANEOUS PROGRAMMING AND RECORDING
James R. Anderson, St. Louis Park, and Andrew E. Abramson, Minneapolis, Minn., assignors to Research, Incorporated, Hopkins, Minn., a corporation of Minnesota
Filed May 11, 1959, Ser. No. 812,163
14 Claims. (Cl. 307—149)

This invention relates to methods and apparatus for simultaneously programming and recording and/or indicating a process or machine function. According to the present state of the art, for doing this there is usually provided a machine which may and usually is called the "programmer," of which there are many kinds available. These customarily employ a "programming cam" or other surface such as an appropriately shaped groove for generating the desired function or there may be used what is known as a "line follower" which is a device for generating an electrical signal according to the shape of a "curve" or "graph" which is drawn on a chart and placed on the machine, which then transmits an appropriate signal. All such devices perform only the "programming" function, that is to say they cause a machine or process to be done in a prescribed way.

Now it frequently happens that it is desirable to indicate or record the actual performance of the machine or process, and this requires a separate machine, known as a "recorder" of which many varieties are available.

It is an object of the present invention to provide a single apparatus which will replace the conventional programmer, controller and recorder/indicator.

It is an object of the present invention to provide a single unit apparatus which is responsive to the machine or apparatus performance to thereby provide the recording/indicating attribute and simultaneously in the device provide the programming function for furnishing an error signal for control of the apparatus or process when the record/indicator shows a deviation from a predetermined program schedule.

It is another object of the invention to provide standard recording instruments which are modified in only minor particulars and as such will then accomplish the aforesaid objects.

It is a further object of the invention to provide a machine wherein a certain function may be programmed by drawing a graph of the intended program as an electrically conductive line (or parallel lines) and utilizing the conductivity of the graph line (or lines) in cooperation with a function responder driven by a function sensor of the process or apparatus being controlled, to establish a signal for controlling the performance of the process or apparatus.

It is a further object of the invention to provide a predetermined graph of intended performance of a process or apparatus, said graph being in the form of an electrically conductive line (or lines) and to move said graph in one coordinate direction on a time or other basis, and relative to a signal pickup device which is moved in a transverse coordinate direction responsive to the actual performance of the device or process as shown by a function sensor in the device or process, and utilize the signal derived by the pickup device from the line for controlling the device or process, and it is a further optional object of the invention to utilize the signal pickup mounting for simultaneously indicating and/or recording on the same graph the actual performance of said device or process.

It is another object of the invention to provide an electrically conductive line (or lines) graph of intended function of a device or process in cooperation with an electrically responsive signal pickup carried by mechanism responsive to the function of said device or process for generating a perfomance control signal input for said device or process.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings in which:

FIGURE 1 is a schematic diagram of the apparatus of the invention;

FIGURE 2 is an isometric view of one illustrative form of apparatus of the invention, certain portions thereof being shown schematically;

FIGURE 3 is an isometric view of another illustrative form of apparatus of the invention, certain portions thereof being shown schematically;

FIGURE 4 is an enlarged side elevational view of the combined function responder-error signal pickup with optional recorder, used in the device shown in FIGURE 2;

FIGURE 5 is an enlarged side elevational view of the combined function responder-error signal pickup with optional recorder, used in the device shown in FIGURE 3;

FIGURE 6 is a diagrammatic view partly in perspective of another exemplary form of the invention, showing the same as constructed by modifying a standard strip-chart recorder in an exemplary apparatus programming-recording system;

FIGURE 7 is a fragmentary perspective view of the recording pen-probe elements and a portion of the strip-chart and roll of the mechanism shown in FIGURE 6;

FIGURE 8 is a diagrammatic view partly in perspective of still another exemplary form of the invention showing it as constructed by modifying a standard strip-chart recorder and utilizing another form of the invention programming features in another exemplary apparatus programming recording system;

FIGURE 9 is a diagrammatic view showing the invention as utilizing a standard form of round-chart recorder/indicator modified in accordance with the invention and exemplifying a heat-process programming-recording system of the invention;

FIGURE 10 is a fragmentary vertical sectional view of another form of pen-probe which may be utilized in the invention;

FIGURE 11 is a perspective view, partly broken away, showing a somewhat modified apparatus and manner of using the invention.

Throughout the drawings corresponding numerals refer to the same elements.

Referring to FIGURE 1, at 10 there is shown a chart of electrically non-conductive material such as paper or plastic, having a width W, which corresponds to the coordinate of response of the process or device 11, and a length L which corresponds to the coordinate of time, distance, etc. relative to which the function of the process or device is controlled. Thus, for example, time would be plotted along coordinate L whereas value of performance function (temperature, pressure, weight, distance, humidity, etc.) would be plotted along coordinate W. The chart 10 may be simply a sheet, or continuous, in which event supply and take-up spools, not illustrated, are provided, or in the form of an endless belt, in which suitable spools are provided (as herein elsewhere illustrated) to enable movement of the graph. In FIGURE 1, only a segment of the length of the chart is illustrated.

Close to the chart, there is mounted a function responder mounting 12, which in FIGURE 1, is an arm pivoted at 13, for swinging movement back and forth across the chart 10, as shown by the arrows 14D (decrease) and 14I (increase). The free end 15 of the responder 12 thus swings in a plane parallel to chart 10 but close to the chart. The responder 12 and chart 10 are moved relative to each other along the axis L. This can be achieved by moving the chart 10 relative to the responder 12, or by moving the responder 12 along the L axis, while the chart 10 is stationary. As this relative motion takes place along axis L, the responder 12 is also moved along axis W according to the signal of the function sensor.

On the free end 15 of the responder there is a pickup 16 in which a signal is generated, the value and sense of which is determined by the position of the pickup 16 relative to the line 18 on the chart. In FIGURE 1 the line 18 is shown as a single line, but as explained elsewhere herein, the line 18 may be in the form of parallel lines. In either form (single or pair) the lines themselves are electrically conductive and provision is made that, in respect to the single line, that an electrical current shall be sent through it along axis L, or in respect to the pair of lines, that a voltage shall be applied across them. The electrical supply for doing this is symbolically illustrated at 20 and the connection of the electrical supply to the conductive line (lines) 18 is shown at 21. The particular form of power source 20, the mode of its connection 21 to the line (lines) 18, the nature of the conductive material of which lines (or lines) 18 are composed and the kind of pickup device 16 which is used (and the form of its errors signal) are elsewhere described in detail relative other illustration of the invention. It is here sufficient to say that these matters are suitably related and that by virtue of the proximity of the pickup 16 to or contact of pickup with line (lines) 18 in which an electrical current flows (or upon which there is an electrical potential), an error signal is generated, the sense of which depends upon whether the pickup 16 is to the left or to the right of line (lines) 18, as shown in FIGURE 1.

The signal pickup 16 is connected via wire (or wires) 22 to an error signal amplifier 24 (where needed) to which a power supply is connected at 25. The output 26 of the amplifier 24 is connected to the process or device controller 27 which is of a kind and form suitable to the particular process or device 11 which is being programmed.

Thus in a furnace control the device 27 would be a servomotor connected to the power supply or heating supply of the furnace. To use the same illustration, the device 11 (i.e. furnace) would have therein a thermocouple or other heat sensitive device 11A connected via lines 28 to a responder driver 29 which may contain such amplifiers 30 as may be required to handle its input. The responder 29 is connected by line 34 to the responder mounting 12. To follow the furnace control example, it will be evident from the foregoing that a chart of desired temperatures may be drawn in conductive material as a line (or lines) 18 on chart 10. When chart 10 is moved in direction 33, the position of pickup 16 may be either to the right or left of line (lines) 18, depending upon the then temperature of the furnace. If too low, the signal of pickup 16 which may be assumed to then be to the left of line 18 (in the "Low Side" area 31L) is effective when amplified to actuate the controller 27 in a direction to move the furnace control to temperature increasing condition and the response of the furnace 11 will be to increase its temperature.

In any event, the temperature as determined by sensor (thermocouple) 11A is communicated to the responder mounting 12 which accordingly positions the signal pickup 16 in a position relative line (lines) 18 either to call for more or less heat or in a neutral condition, in the event the then setting for heat input corresponds to the then position of the line 18. The chart, rolls for moving it, arm or other mounting 12, function responder drive 29 and link 34 are a standard recorder, hence the signal pickup 16 can also be the usual mounting for a recording pen 32 which (using electrically non-conductive ink) writes a record on chart 10 as it moves, thereby providing a graph of "performance" on the chart which also programs the operation. In this way the chart 10 serves not only to program the desired performance but also serves as a record of the performance actually achieved. By mounting a scale adjacent pickup-pen 16—32, the position of the pickup pen on the chart can also provide a continuous indication of performance.

Referring now to FIGURES 2 and 4, there is shown one specific form of the invention made by modifying a standard strip-chart recorder. This utilizes a chart 40 which is arranged to run on rollers 41, 42, and 43. The chart 40 may be an endless belt or a conventional strip chart running between supply and takeup rollers. Roller 41 is driven by a conventional chart drive motor 44 which is energized by power supply 45. When power supply 45 is turned on, motor 44 drives belt 40 in the direction of chart movement denoted by arrow 46.

By using a motor 44 having a speed adjustment 46, the movement of the time-base of chart movement can be adjusted.

It will be understood therefore that motor 44 may be either of constant or variable speed, according to the installation desired.

The chart 40 is of nonconductive material such as paper and upon it the graph of the planned operation (i.e. the "program") is drawn. In this illustration the graph is drawn as a pair of parallel lines 47A and 47B, according to the mode and method set forth in the commonly assigned co-pending application of James R. Anderson, Ser. No. 793,400, filed February 16, 1959, now Patent No. 2,941,135, which is incorporated herein by reference.

According to the aforesaid application, the lines 47A—47B each need be only sufficiently conductive that an electrical charge applied to one or several places along the line will be conducted elsewhere therealong. In effect, each line, 47A and 47B are conductive boundaries but need not be highly conductive. Thus an ordinary pencil line on ordinary paper will suffice. Several modes of making the chart are described in application Ser. No. 793,400, and any of these may be used. For simplicity there is herein described only one such mode of constructing the chart.

Thus line 47A is conductive and is connected by conductive lines 47A–1 through 47A–4 to a conductive side track 47AT upon which a conductive wheel 47AW runs. The wheel is insulated from the machine frame (not shown) and is connected directly to line L1 and hence the potential of line L1 is applied to the whole system of lines 47AT; 47–1 through 47A–4 and 47A.

Similarly line 47B is conductive and is connected via conductive lines 47B–1 through 47B–4 to conductive side track 47BT upon which conductive wheel 47BW runs. This wheel also is insulated from the frame and is connected to line L2 and hence the whole system of lines is at the potential of line L2.

Lines L1 and L2 can be energized at any convenient voltage and frequency. Commercial frequencies such as 60 cycles or the less-usual frequencies such as 25, 50, 62½, 400, and 500 cycles are equally usable. Direct current may be used. Indeed, special power sources may be used, if available, as for example, battery power; special alternating current generators. The usual voltage such as 110 volts A.C. works very well, and is preferred, because of availability and freedom from undue hazard, but higher or lower voltages may be used.

A potentiometer resistor 48 having center tap 49 is connected across lines L1 and L2, to provide a center-tap potential. Where alternating current is used, resistor 48 may be replaced by a secondary winding of an isolating transformer, likewise provided with a center-tap, as shown in the aforementioned application or FIGURE 9 hereof.

Across the front of the machine and parallel to the surface of belt 40, as a part of the usual equipment of a strip-chart recorder there is a frame rod 50 upon which the recording head usually an inking pen is mounted. According to this invention the usual inking pen of the recorder is discarded or revised and made into an element which not only acts as a pen but also acts as a probe to pick up the electrical signal. This element is here generally designated 51. The element 51 is adapted to slide back and forth on the usual mounting rod or frame 50 and in the standard "recorder" this is accomplished by some motor mechanism and mechanical linkage which is in turn responsive to the input signal. One common form of drive for such purpose is generally known as the re-balancing bridge system with suitable servo drive. There are other suitable systems. The only necessary criteria so far as this invention is concerned is that the pen-probe 51 should be positioned according to true functioning of the process. Merely as an illustration, in FIGURE 2, the pen-probe 51 is shown as connected to one run (52A) of a wire-belt 52A—52B which runs over idler pulley 54 and drive pulley 55, the latter being driven by servo-motor 57 powered through lines 58 from servo-amplifier 59. When servo-motor 57 turns one direction or the other it will, through the wire-belt 52A–B move the head 51 back or forth across the chart and re-balance the input signal against the standard cell 175 via potentiometer 174 which is operated from servo-motor 57 by link 39.

Servo-amplifier 59 is connected through lines 60 to the function response sensor 61, on the process or device 62, and the pen-probe head 51 is accordingly positioned at a place across the chart, which corresponds in position to the incoming signal of the function or process as produced by sensor 61.

Regulation of the process or device is accomplished by the function controller 63 which is powered so as to increase or decrease the function via lines 64 from an error signal amplifier 65.

Power is supplied via 66 and 67 to the amplifiers.

Referring to FIGURE 4, there is illustrated one form of signal pickup and recording head (pen-probe) 51. As here shown this element 51 is shaped so that it extends toward the belt 40 and has an inkwell 68 leading via capillary channel 69 in pen tube 70 to pentip 71, and when ink is in the well 68, it will be distributed (as a line) on chart 40, as the chart moves. The pen-tube 70 is very small and around it near the tip 71 is a collar 72 of conductive material which is connected via shielded flexible leadwire 74 and line 74A to the input terminal 75 of the error signal amplifier. The collar 72 is provided with a point 72P, which being close to chart 40 will have established thereon a potential which can be any potential from L1 to L2 depending upon the position of the head 51 relative lines 47A and 47B. If between these lines, the point 72P will have a potential between that of L1 and L2, movement towards one line makes the potential likewise approach the potential of that line. If directly over line 47A (or 47B) the potential of point 72P will be the same as that of the line. Also, if the head 51 should "get lost" to the left of line 47A, that is in the area between line 47A and edge line 47AT, the point 72P will pick up the potential of L1 and similarly if "lost" to the right of line 47B, that is between lines 47B and 47BT the potential on point 72P will be that of lines L2.

The potential of point 72P (and hence of terminal 75) is measured relative the potential of center-tap 49 which is connected via line 76 to the second input terminal 77 of error signal amplifier 65. Hence when point 72P is right in the middle between lines 47A and 47B, the error signal voltage on terminal 75 will be zero as measured relative the center-tap voltage on terminal 77. As the point 72P approaches line 47A, it will present on terminal 74 a voltage which, when measured relative the center-tap 49, increases in a negative sense to ultimately one-half of the potential between L1 and L2 (when pointer 72P is over, or to the left of line 47A). That is to say, terminal 75 will be more negative than center-tap terminal 77. Similarly as point 72P approaches line 47B the voltage presented to terminal 75 will increase ultimately to one-half the potential of lines L1 and L2 but in this instance this voltage will be in a positive sense relative the voltage on the center-tap terminal 77. This voltage of point 72P (see FIGURE 4) here designated, the "error signal," is amplified via amplifier 65 (see FIGURE 2) and through suitable relays or other appropriate controls (not shown) energizes circuits 64 to operate the function controller to cause the device or process 62 to "increase" when the error signal is negative (i.e. calls for "increase") or to "decrease" when the error signal is positive (i.e. calls for "decrease").

Accordingly, as the motor 44 progresses the chart 40 in the direction of chart movement whenever the "curve" exhibits an increase or decrease of function (transversely of chart 40), the position of the conductive lines 47A and 47B will move transversely relative to the pickup and recorder head (pen-probe) 51 and in so doing the point 72P will have imposed thereon a signal which increases (in either the positive or negative sense) as the point 72P approaches one or the other of the lines, and this error signal which is imposed on terminals 75—77, causes appropriate corrective operation of controller 63, to cause the process or device to increase or decrease the function under consideration. The pickup and recorder head (pen-probe) 51 is, however, under the exclusive control of the function sensor 61 and the signal for corrective action will persist until the process or device has responded, if it does respond. In any event a record of response is recorded directly on the chart 40 by pentip 71, and the person monitoring the operation is immediately informed of any current or past lack of response.

For example, as shown in FIGURE 2, the track at PF indicates that the process or device was functioning properly, that is to say, it follows generally along the approximate center of the space between lines 47A and 47B, with slight zig-zags as correction is from time-to-time applied. Thus, if device 62 was for example an electrically operated heat treating furnace in which a particular temperature-time program is desired, as depicted by curve 47A—47B, the proper temperature response would be indicated throughout the period PF. However, let us suppose that, at PO there was a power failure to the furnace heating circuits. The pickup 72P provides a signal to call for heat. Nevertheless the responder 61 is to show a decrease in furnace temperature which is, of course, occasioned by the power failure. Then at PR the power was restored, and the temperature then increased to NF where the system returns to normal functioning. In the period from PO through PR to NF the error signal was one-half of the L1—L2 voltage and negative in respect to center-tap 49, consequently indicating a "maximum" heat demand signal to the function controller 63. That such heat was not supplied was not the fault of the controller 63, which under such conditions, would be in the maximum heat supply condition.

Referring now to FIGURES 3 and 5, this form of the invention is identical with that shown in FIGURES 2 and 4 except that the chart 80 is made with a single electrically conductive line 82 (instead of a pair of lines 47A—47B) and through this single conductive line, a high frequency current is conducted. In this system, the pick-up 81 is provided with one or more coils 95 (see FIGURE 5) in which an error signal is induced rather than a probe point 72—72P on which a simple static potential is established by proximity as in FIGURE 2. In the FIGURE 3 modification, an appropriate high frequency power source and lead-in are provided to permit the requisite current to flow through line 82 and the amplifier 65 is of a kind appropriate for handling an error signal of high frequency.

Thus in FIGURE 3, the general layout of the mechanism is the same as FIGURE 2, but chart 80 has a line 82, the conductivity of which is as good as conveniently possible. The greater the current flowing through the "line" 82, the greater will be the strength of the error signal in coil 95, since the induced voltage in coil 95 depends directly upon the magnetic flux around line 82 and hence upon the current in line 82. Therefore line 82 is made as good as possible from the electrical conductivity standpoint. A high frequency generator 87 powered from supply 88 feeds lines 85 and 86 from terminals 85A and 86A respectively. Line 85 connects to conductive roller 83 and line 86 connects to conductive roller 84. These conductive rollers physically contact the line 82 where the chart passes over rollers 41 and 42 and consequently there is a circuit from terminal 85A via line 85 through roller 83 to line 82 and thence through roller 84 and line 86 to terminal 86A. The current from source 87 hence flows through line 82.

The frequency of source 87 can be a high frequency, such as radio frequency. The current in line 82 causes a magnetic field around line 82 and a coil (or coils) held proximate line 82 will have induced therein a voltage, the phase of which depends upon the position of the coil 95 relative to the line and the value of which depends upon the strength of magnetic flux around line 82.

FIGURE 5 shows how the coil 95 surrounds the tip 94 of pen-tube 92. Hence as the pen-tube "writes" a record of performance on chart 80, the coil 95 picks up a signal appropriate to its position relative line 82. The signal is conducted via lines 95—96 to terminals 75—77 of amplifier 65, which is connected as previously described, to function controller 63.

The overall operation of the FIGURE 3 system is similar to that of FIGURE 2, except as to the mode in which the error signal is induced. The drive connection between the function response sensor 61 and function responder 51 of FIGURE 2 and 81 of FIGURE 3 includes leads 60, a servo-amplifier and servo-transmitter 59, leads 58, the function responder (servo) drive motor 57 and the mechanical gear composed of pulleys 54 and 55 and wire-belt 52A–B.

The complete drive connection between sensor 61 and the responder 51 (or 81) can be any form of connection which satisfactorily transmits the required motion. Thus, where device 62 is a mechanism (where, for example, "position" is the function desired to be controlled), a simple mechanical or hydraulic linkage can be used, in which event the device 61 would be hooked to head 51 (or 81) by, say, a simple link, shaft or system of pulleys, or by a hydraulic follow-up mechanism (see FIGURE 6). Such variations shall depend largely upon the requirements of the particular installation.

FIGURES 6 and 7 illustrate another embodiment of the invention. Here the chart 40 is carried by rolls 41 and 42 and has drawn thereon a graph of the type shown in FIGURE 2 composed of a pair of conductive lines 47A—47B which can be drawn as pencil lines or of other conductive material as described in application Ser. No. 793,-400, aforementioned. These lines 47A and 47B are connected by a few or many conductive lines 47A1, 47A2, etc. and 47B1, 47B2, etc. to conductive wheel tracks 47AT and 47BT respectively. The chart 40 is moved in the direction of chart movement (as shown by the arrow) by motor 44. Potential applied via lines L1 and L2 to wheels 47AW and 47BW respectively and thus to the conductive boundaries 47A and 47B respectively, produce a potential gradient between these boundaries to which the pen-probe 91 is sensitive.

The pen-probe 91 is a tiny metal inkwell with a downwardly extending tip, mounted in an insulating bushing in arm 92. The inkwell tip 91T rides on the paper chart 40 and inks a line. The ink, being non-conductive, does not disturb the potential gradient between lines 47A and 47B and the tip 91T hence assumes an electrical potential corresponding to the position of the tip along the potential gradient between lines 47A and 47B.

The potential of tip 91T is measured relative center-tap 49 of the transformer 98 and the error signal is fed via lines 74 and 76 to amplifier 65 which, through lines 58 feeds servo-motor 63 and the latter, through gear 94 and rack 95 moves slide valve 96. Valve 96 controls drain (or return) line 97 and supply line 99 from supply tank 101. When valve 96 is in the position shown both lines 96 and 99 are closed. Movement to the right in FIGURE 6 opens supply line 99 (while drain line 96 is closed) and movement to the left opens the drain line (while supply line 99 remains closed). In this way the level of fluid F in tank 106 can be controlled. Tank 106 may if desired have a "use" circuit 100 from which the liquid flows out at a constant pressure determined by the level in the tank 101.

The level of fluid F is sensed by a float 102, which is connected by lever 103 and link 104, directly to arm 92 which carries pen-probe 91.

FIGURE 6 thus illustrates how in some instances the function response sensor 61 (102 in FIGURE 6) may sometimes more conveniently be connected mechanically (to the pen-probe holder) rather than through a servo system (60—59—58—57 55—52—54 of FIGURES 2 and 3). Also in FIGURE 6 a simple scale 105 mounted adjacent arm 92 acts as an Indicator Scale, arm 92 being the "pointer."

In FIGURE 8 the connection between the function response sensor and the pen-probe is a mechanical linkage as in FIGURE 6, and the process or device controller is operated by a relay system the electrical input of which is directly obtained from conductive lines on the chart. Thus in FIGURE 8 the chart 40 and drive rollers 41—42, motor 44, wheels 47AW and 47BW, all conductive lines on the chart 40, arm 92, pen probe 91, linkage 103—104, float 102, tanks 101 and 106 all are the same as in FIGURE 6. However, the control of the function (here illustrated as fluid level control for tank 106) is modified. Thus battery (or other potential source B1 connects through switch 130 to junction 111 and to junction 110. From junction 111 circuits extend through coils of relay F ("Fill" relay), E ("Empty" relay), junctions 112 and 113 respectively. Relay F has two normally open contacts F1 and F3 and one normally closed contact F2. Relay E has two normally open contacts E2 and E3 and a normally closed contact E1. A circuit extends from junction 112, through junction 117 to wheel 47AW and from junction 117 through normally open "Start" button 109 to junction 118. Junction 110 and spindle 92A (on which arm 92 is pivoted) are grounded. A circuit extends from junction 112 through contacts F1, E1, junction 110, contacts F2, E2 to junction 113, and from the latter to wheel 47BW. Battery B2 is also connected to junctions 120 and 121. From junction 121 through contact E3, solenoid coil 115 to junction 120, and from junction 121, through contact F3 and solenoid coil 114 to junction 120. Solenoid coil 115 when energized opens drain valve 108 in the drain (or return) line 122. Solenoid 114 when energized opens fill valve 105 in supply line 123 which delivers to tank 102.

The pen-probe 91 in this instance derives its signal by direct contact with line 47A or 47B (or with any of the conductive lines 47A1, 2, etc. or 47B1, 2, etc., connected respectively thereto).

Assume the tank 102 is empty, and pen-probe 91 is then to the left of line 47A, but may not exactly contact any conductive line. The system is set in operation by first closing circuit to motor 44 and closing switch 130. Then by pushing button 109 there is closed a circuit to relay coil F thereby establishing a self-holding circuit from battery junction 111, coil F, junction 112 (closed) contact F1, then closed contact E1, to battery junction 110. This also opens contact F2 and closes F3, thereby opening fill valve 105. If the pen-probe 91 contacts any conductive line to the left, of line 47A, a circuit is established from ground to spindle 92A, arm 92, pen-probe 91 (which in this figure is connected to arm 92, not insulated) then via conductive lines on chart 40 to wheel 47AW and junctions 117 to coil F, junction 111, switch 130, battery B1, junction 110 to ground. So, pushing button 109, or contact of pen-probe 91 with any of the conductive lines connected to line 47A on the chart 40 will close the circuit to fill valve solenoid 114 to open fill valve 105. This condition maintains until float 102 and linkages 103—104 are moved by the rising fluid to move arm 92 (and pen-probe) to the right until the pen point enters the space between lines 47A and 47B. Even then, the self-holding circuit of coil F (via contact F1) does not open, so the valve 105 remains open until the pen point finally touches line 47B, whereupon a circuit is this time established from ground, to spindle 92A, arm 92, pen-probe 91, line 47B, wheel 47BW, junction 113, coil E, junction 111, switch 130, battery B1, junction 110 to ground. Energization of coil E opens contact E1 and closes contacts E2 and E3. Opening contact E1 breaks the self-holding circuit of relay F whereupon it opens, thereby closing contact F2 (which had been open) and a self-holding circuit for coil E is thereupon established via F2 and E2. Closure of E3 energizes the solenoid 115 to open the drain valve 108, and the tank begins to empty. As the fluid level decreases the pen-probe finally reaches line 47A which initiates the "fill" cycle and terminates the "empty" cycle. Hence the level of fluid will oscillate up and down between the levels determined by the spacing between parallel lines 47A and 47B and as the curve composed of these parallel lines changes direction the average level will be changed accordingly. The "use" circuit from tank 106 is via line 100 which can be controlled by the valve in that line. In some cases the drain (or return) line 122 may be shut off by closing the manual valve in that line below the solenoid valve 108. In this event the "empty" relay E energizes as previously described and breaks the relay F holding circuit at contact E1 when the pen-probe 91 contacts line 47B, but the fluid level would not be drawn down because line 122 is (assumed) closed by the manual valve. Decrease in water level then awaits demand, via use circuit 100, and the system oscillates by filling only with decrease in water level subject to demand only.

FIGURE 9 shows the invention made by modifying a standard round-chart recorder, of which many are available. Any form of recorder may be easily modified to utilize this invention. In the round-chart recorder illustrated there is a generally rectangular front face plate 155 on which the chart 140 is laid. In many recorders the front face 155 is metal. In modifying the recorder this face 155 is made of insulating material so as not to disturb the potential gradient between lines 147A and 147B. The chart is revolved on a time basis so that the chart will turn once around in a certain time period. In this particular recorder the chart is held on a center spindle 155A and is kept in place by a retainer cap 150 supported on a wire-work frame 151—152 that is attached to shaft 153 pivoted in ears 154—154 on face plate 155. This permits cap 150 to swing (forwardly) away from faceplate 155 to allow changing the chart. The chart turns on the spindle and slides on the smooth surface of faceplate 155.

The rotation of the chart is via a little power driven drive roller behind the chart in the opening 155B. The drive roller (not shown) bears against the back side of the chart thru opening 155B. A little pressure roller 147BW bears against the front face of the chart directly over the drive roller, to hold the chart against the drive roller.

This usual and well known recorder drive is modified as follows: The little pressure roller here designated 147BW (corresponding to 47BW of FIGURES 2, 6, and 8), is mounted so that it is insulated from the recorder frame and the edge of the chart is provided with a conductive marking 147BT (corresponding to 47BT, FIGURES 2, 6, and 8). The wheel 147BW supplies electrical potential to conductive track 147BT and the latter is connected by one or more conductive lines 147B1, 2, 3, etc. to the outer of the conductive graph lines 147B. This accordingly supplies electrical potential to line 147B.

Similarly, the wire frame 153, 152, 151 and cap 150 are insulated from the recorder frame. This can most conveniently be done by making the whole faceplate 155 of insulating material (rather than a metal stamping) or by making pivots 154 of insulation. Then at some small radius on the chart there is made another circle 147AT of conductive marking material (such as ordinary "lead pencil" or conductive ink) and on the frame 151, 152 at an appropriate position there is soldered on a little spring finger or brush of metal 147AW which bears against the mark 147AT and hence conducts electrical potential to it. This brush substitutes for a wheel at the inner radius mark 147AT. The whole wire frame work and cap (150–153) is made so as to be spring-biased or otherwise biased to swing towards the chart 140.

From conductive inner mark 147AT there are several conductive connecting marks 147A1, 2, 3, etc. leading outwardly to the (inner) parallel conductive marking 147A and hence potential applied to frame 150–153 is also applied to the line 147A.

The chart may also have on it a plurality of non-conductive markings as scale-markings.

The only other modification needed for converting the standard round-chart reporter for embodying this invention is to change the normal "pen" of the round-chart recorder to a combined "pen-probe" as shown at 16 (FIGURE 1) or at 51 (FIGURES 2, 4, and 5) or at 81 (FIGURE 3). Any of the forms of pen-probe already described or as shown in FIGURE 10 (to be described) may be used as the pen-probe 160 of FIGURE 9.

It will be understood that in the standard round-chart recorder there is already provided an arm 161 pivoted at 159 and connected to be moved by link 162 driven by servo-motor 163. Thus under bracket 165 there is illustrated one usual form of re-balancing-bridge type recorder servo-drive mechanism, utilizing a standard cell for calibration. For example at 170 there might be an electric furnace or oven having a heater 171, the temperature of the furnace being sensed by thermocouple 172. The thermocouple signal voltage is balanced against potentiometer 174 energized by standard cell 175, and the resultant D.C. signal voltage on lines 176 and 177 is applied across center-tap terminal 178 of input transformer secondary winding 179 and to terminal 181 of chopper 182. The chopper converts the D.C. thermocouple signal to A.C., which is applied across first one-half and then the other half of the winding 179. The transformer 179–180 accordingly applies this thus converted A.C. signal to the first stage of the amplifiers. As many amplifier stages as desired may be used but the net result is that at output terminals 184 and 185 there is produced an A.C. voltage which has a phase determined by whether the thermocouple voltage was above or below a certain value, said value being determined by the amount the thermocouple voltage differed from the standard. This amplifier output is applied to one winding of the servo-motor and line A.C. voltage is applied to the other winding and this results in a rotation one way or the other, which moves arm 161 via link 162. At the same time link 190 re-balances potentiometer 174 until that portion of the potentiometer voltage applied to the thermocouple circuit just cancels the thermocouple voltage, after which rotation of motor 163 ceases.

According to the present invention the arm 161 or at least the electrical sensing element of pen-probe 160 is insulated, and an electrical signal is thereby established on the pen-probe according to its then position relative lines 147A and 147B. This signal is carried via shielded line 191 to input terminal 192 of amplifier 193. The other input terminal 194 of the amplifier 193 is grounded and also connected to center-tap 49. The ends of winding 98 of transformer 194 are connected via lines L1 and L2 to respectively the contact frame 150–153 and hence to brush 147AW and to contact wheel 147BW.

Amplifier 193 is a standard amplifier. An error signal received across terminals 192—194 is amplified and is applied via output terminals 201 and 202 to one of the windings 204 of servo-motor 205 which is connected through linkage 207 to operate the voltage controller 208 which regulates the power applied to the heater 171. A.C. power at terminals 210 and 211 is also applied to winding 206 of servo-motor 205. The motor 205 is of course connected so that when the amplified error signal calls for increased heat the regulator 208 will be operated in an appropriate direction to increase power to heater 171.

In FIGURE 10 there is shown one very convenient and readily available form of pen-probe as applied to a strip-chart recorder. The same idea can obviously be used for the circle-chart recorders. In this figure the mounting arm may be the mounting arm or means of any of the previously described devices, namely arms 12, 50—53, 92, or 161. The pen-probe is simply a ballpoint pen "refill" having a metal tip 220 which has in it the "ballpoint" 221 and a plastic inktube 222 connected thereto. This inktube 222 is normally straight or nearly so, in a ballpoint pen, but it is here bent back as needed, and held by clip 224 to conform more or less to the general shape of the mounting arm or means. The metal (usually conical) tip 220 of the "refill" has a cylindrical part 225 where it connects to the plastic tube and this is pushed into an insulating bushing 226 set in the end 227 of the mounting. A shielded wire connection 230 is made to tip 220.

The ball point ink is not conductive and the ball 221 rolls on the chart paper and "writes" the record. At the same time the ball 221 and its conical mounting 220 acts as a probe to obtain a static charge from the conductive marks on the chart paper.

In FIGURE 10 there is also shown a lifter for the mounting arm consisting of a rod 232 mounted for rotation on an eccentric axis. In the full line position the rod does not lift the mounting arm, but in the dotted line position the arm is lifted just enough to lift the ball 221 off the chart, but the ball will still obtain a static potential from the electrical field between the electrically charged lines on the chart. A lifter 232 is also shown in FIGURE 7. Like that of FIGURE 10, the bar is mounted eccentrically so that when rotated to the "up" position, the arm 92 and hence pen-probe 91T will be lifted just enough so as to be out of engagement with the chart 40.

It is perfectly feasible in accordance with this invention to make a chart having the desired "program" of operation graphically depicted thereon, all as previously described. This chart and by use of the invention, is utilized to provide the signal input to control the device or process. The recorder can if desired be arranged to mark directly on this same chart, the actual performance achieved by the device or process.

It is also within the purview of the invention to use one "program" chart (where repeated operations are desired) and then place a blank chart of vellum paper or the like, right over it in the programmer-recorder machine. This is shown in FIGURE 11, as applied to circular chart. The vellum can be held in place by a pressure sensitive adhesive at one or more places on its back side or by bits of tape 140T as shown in FIGURE 11. The marked "program" chart 140 underneath the vellum can easily be seen through the vellum and the operator can hence monitor the performance. At the same time the vellum overlaid chart 140V in no way impedes the production of a signal by the voltage method (FIGURES 2, 6, 7, 8, 9, and 11) or by the magnetically induced method (FIGURE 3). Thus the controlling function can take place even though a vellum sheet is placed over the "program" chart. The mode of operation using a vellum overlay can easily be adapted for use in flat rectangular charts in the same manner as for the circular charts shown in FIGURE 11, and it can be applied to continuous strip-charts by supplying the vellum from a supplementary roll so that it runs onto the program chart as an overlay.

Meanwhile the written record of performance is made only on the vellum overlay since it is next to the pen. Therefore, one "program" chart can be used repeatedly. When a "program" chart is to be used repeatedly, it is on good strong paper or plastic sheet and made with precision and neatness. When a "program" chart is to be used only once, or a few times, it can be made almost casually with lead pencil, for a high degree of precision and neatness is not essential for the invention.

It is, of course, understood that the vellum overlay does not cover the potential input lines 47AT, 47BT, 147AT, and 147BT, which are left fully exposed.

In process programming the function response sensor may be of any type which may, for example, sense the particular factor under consideration such as temperature, pressure, salinity, viscosity, humidity, etc. and the sensor is equipped with a suitable transmitter, which can be a direct link or of a servo-type illustrated.

The spacing of the conductive edges (47A—47B; 147A—147B, etc.) (or lines) may be varied to suit the needs of the particular installation. The effect of varying the spacing is the same as varying the closed-loop gain of the whole system being controlled. It is sometimes desirable, even on one graph, to vary the spacing between the conductive edges (47A—47B; 147A—147B, etc.) as where there may be a need for closer system control to provide desired response. In general, closer spacing increases the closed-loop gain and accuracy of control whereas wider spacing has the opposite effects.

In the illustration herein the charts are (for the most part) shown as being moved relative to the path of movement of the pen-probe (which moves on axis W, transversely to the path of movement of the chart at a fixed position relative axis L).

However it is well known in the art of line followers especially to hold the chart still to translate the pen-probe relative the chart on axis L as it is moved transversely on axis W. It is within the purview of this invention to use such relative motions in the system of this invention, the criteria being only to provide the specified relative motions.

In FIGURE 2 and 3 the circuit to the chart drive motor 44 is illustrated as being provided with a simple on-off switch and with a speed control device. These same features may be provided in any form of the invention in conjunction with the drives by which the chart and pen-probe are moved relative to each other on axis L (or the corresponding arcuate direction of FIGURES 9 and 11). When the drive motor (example motor 44) is stopped, the system then operates as a set-point control, a very desirable feature in many processes. Also the speed controller of motor 44 may be regulated manually or automatically in response to some outside function thus providing a facility by which the system may be inter-related to the outside function.

As many widely apparent different embodiments of this invention may be made without departing from the spirit and scope thereof, it is to be understood that we do not limit ourselves to the specific embodiments herein.

What we claim is:

1. A function programming system comprising a chart having as coordinates, a path of relative chart movement and an axis of movement transverse thereto, said chart having thereon a graph line of intended values of the function plotted on said transverse axis for each position along the path of chart movement, the area of said chart which constitutes said graph line being of an electrical conductivity which is different than the conductivity of the adjacent areas of the chart, means for applying to the chart different electrical potentials on each side of the graph line for causing an electrical potential in space to be established along the transverse axis at said graph line, means for moving said chart along the path of relative chart movement, a pickup responder mounted for movement proximate the chart but out of contact therewith and along a path parallel to said transverse axis, a controlled device separate from the system and capable of performing a function, a function sensor connected to the controlled device for sensing the function thereof and drive means connecting the sensor and pickup responder for moving the latter to varying positions along its path of movement in accordance with values of the function sensed, said pickup responder including an electrical potential pickup probe positioned so as to be responsive to the electrical potential in space, a function controller, and means delivering the electrical potential of the pickup probe to the function controller for proportionately controlling the controlled device in accordance with the electrical potential in space received on said probe.

2. The system specified in claim 1 further characterized in that said pickup responder is equipped with means for inscribing the chart for recording the actual values of function of the controlled device thereon.

3. The system of claim 1 further characterized in that said graph line is a narrow line-like non-conductive area bounded by electrically conductive edges across which a potential is applied and said electrical potential pickup probe receives a potential due to the probe's position in the electrical field relative to said edges.

4. The system of claim 1 further characterized in that said drive means connecting the sensor and the pickup responder includes a servo-transmitter actuated by the sensor and connected to a servo-receiver, the latter being connected to the pickup responder for actuating it.

5. The system of claim 1 further characterized in that the means for moving the chart includes a rate regulator for varying the speed of relative chart movement.

6. A device for controlling and recording the operation of a system having a system controller and a system operation sensor comprising a recorder device having thereon a chart of electrically non-conductive material which is moved on a time schedule and a marker and an actuator therefor on the recorder, said actuator being connectable to the system operation sensor so as to be controlled thereby for marking the chart with a record of the system operation, said chart also including thereon a graph depicting a program of desired operation of said system, said graph being composed of spaced generally parallel electrically conductive boundaries defining a narrow electrically non-conductive line-like strip of chart which constitutes the graph on said chart, different electrical potential means connected respectively to said electrically conductive boundaries for establishing an electrical potential between them and in the space adjacent thereto, electrical potential signal pickup probe means comprising a part of the marker mounted on the marker so as to be close to the chart when the marker is marking the chart, and formed so as to have an electrical signal imposed thereon from the electrical potential in space caused by the electric potentials on said boundaries, said signal being proportional to the position of the marker relative to the graph, means connecting said signal pickup probe means to the system controller for delivering the electrical potential of the probe to the controller for operating said controller proportionately in accordance with the program depicted by said graph.

7. The device specified in claim 6 further characterized in that the chart is constructed on a system of rectangular coordinates.

8. The device specified in claim 6 further characterized in that the chart is constructed on a system of polar coordinates.

9. The device specified in claim 6 further characterized in that an electrically insulating sheet is placed over the chart for receiving the record produced by the marker.

10. A device for controlling and recording the operation of a system having a system controller and a system operation sensor comprising a modified recorder having a chart and means for moving said chart on a prescribed basis and a record marker together with a motor mechanism connected thereto for moving it, said motor mechanism being connectable to the system sensor so as to be operated thereby in response to signals received from the sensor for recording the operation of the system, the modification including a graph on the chart having generally closely spaced generally parallel edges defining boundaries of electrically conductive material, the space between said edges being nonconductive and depicting the graph of intended system operation, different electrical potential means connected respectively to said edges so as to charge them to different electrical potentials, and thereby produce a potential gradient between said edges and in space adjacent said edges, and an electrical potential signal pickup on the marker mounted so as to be positioned in space close to said edges when the record marker is on the chart and oriented so as to have an electrical signal imposed thereon by the potential in space and which is proportionate to the position of the marker relative to the edges, means connecting said signal pickup probe to the system controller for delivering the electrical potential of the probe to the controller for operating it to proportionately control the system in response to the potential gradient between said edges.

11. The device specified in claim 10 further characterized in that the signal pickup is a ballpoint pen.

12. The device specified in claim 10 further characterized in that means is provided on the recorder for holding the marker out of contact with the chart so it does not record thereon but is in a position in which the signal pickup is still effective.

13. The device specified in claim 10 further characterized in that means is provided on the recorder for holding the marker out of contact with the chart so it does not record thereon but is in a position in which the signal pickup is still effective, and an indicator scale is provided adjacent the path of movement of said marker for providing an indication in cooperation with said marker.

14. The device of claim 10 further characterized in that means is provided for interrupting the operation of the means for moving said chart.

References Cited in the file of this patent

UNITED STATES PATENTS

| | | |
|---|---|---|
| 2,156,289 | Hoy | May 2, 1939 |
| 2,503,052 | Keinath | Apr. 4, 1950 |
| 2,588,386 | Hubbard et al. | Mar. 11, 1952 |
| 2,598,937 | Parker | June 3, 1952 |
| 2,611,115 | Johnson | Sept. 16, 1952 |
| 2,679,620 | Berry | May 25, 1954 |
| 2,744,225 | Rorden | May 1, 1956 |
| 2,746,832 | Blakeslee | May 22, 1956 |
| 2,835,858 | Mosely | May 20, 1958 |
| 2,903,323 | Riester et al. | Sept. 8, 1959 |
| 2,912,052 | Maltby | Nov. 10, 1959 |
| 2,941,135 | Anderson | June 14, 1960 |